C. F. BURKHART.
SHOE CLEANING AND POLISHING MACHINE.
APPLICATION FILED JAN. 12, 1916.
1,196,658.
Patented Aug. 29, 1916.
12 SHEETS—SHEET 2.
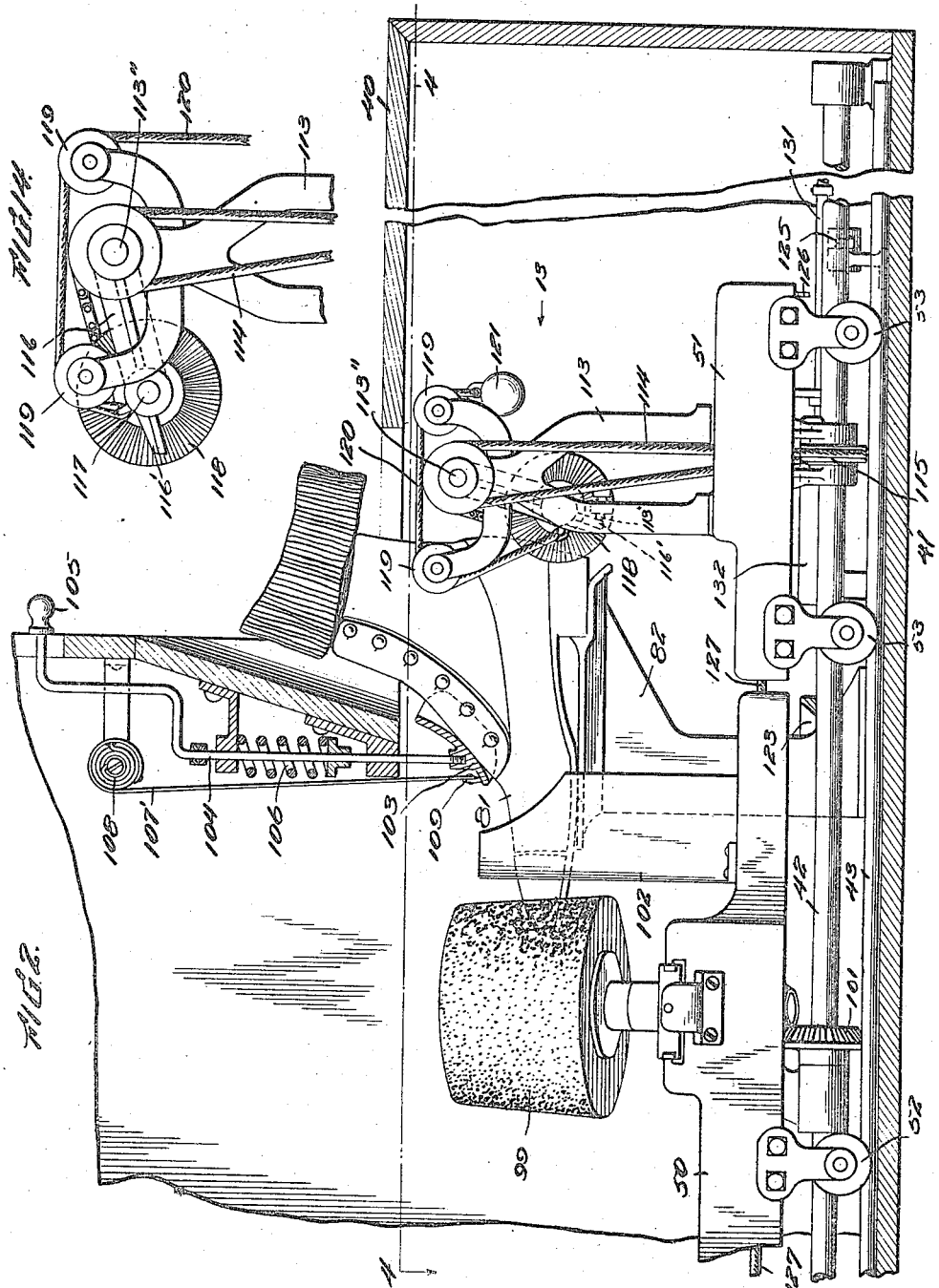
Charles F. Burkhart, Inventor
By Mason Fenwick Lawrence
Attorneys C. F. BURKHART.
SHOE CLEANING AND POLISHING MACHINE.
APPLICATION FILED JAN. 12, 1916.
1,196,658.
Patented Aug. 29, 1916.
12 SHEETS—SHEET 3.
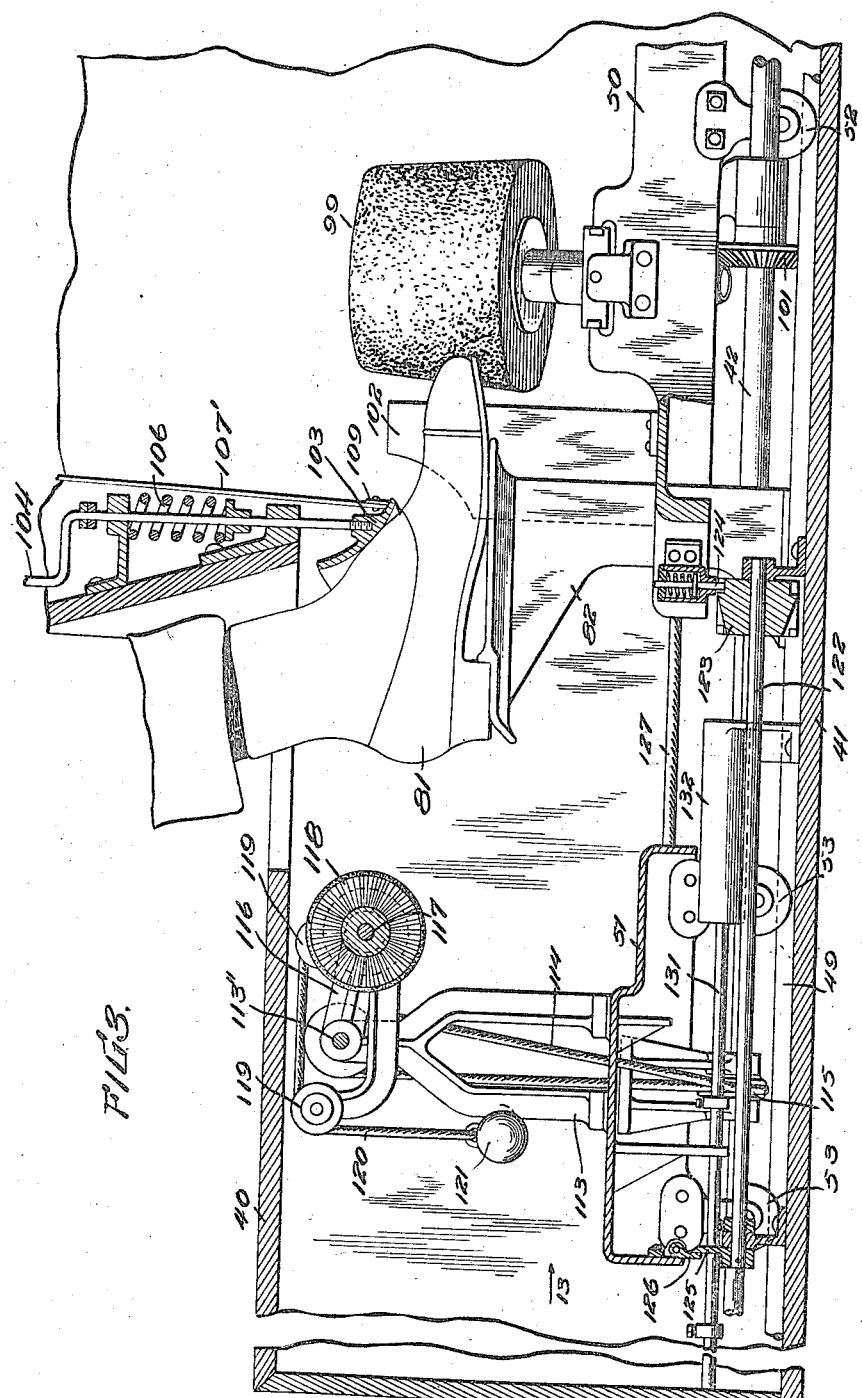

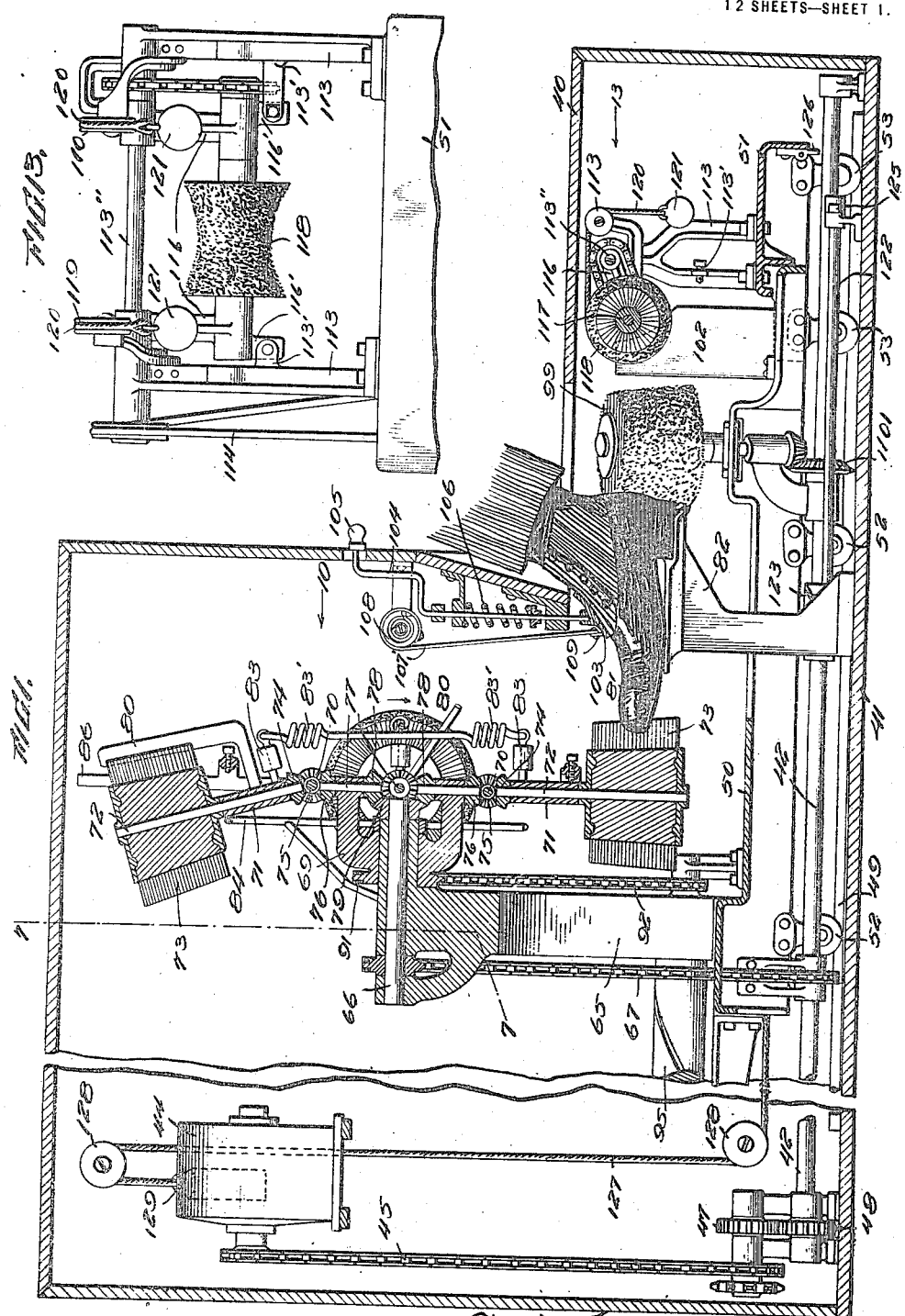

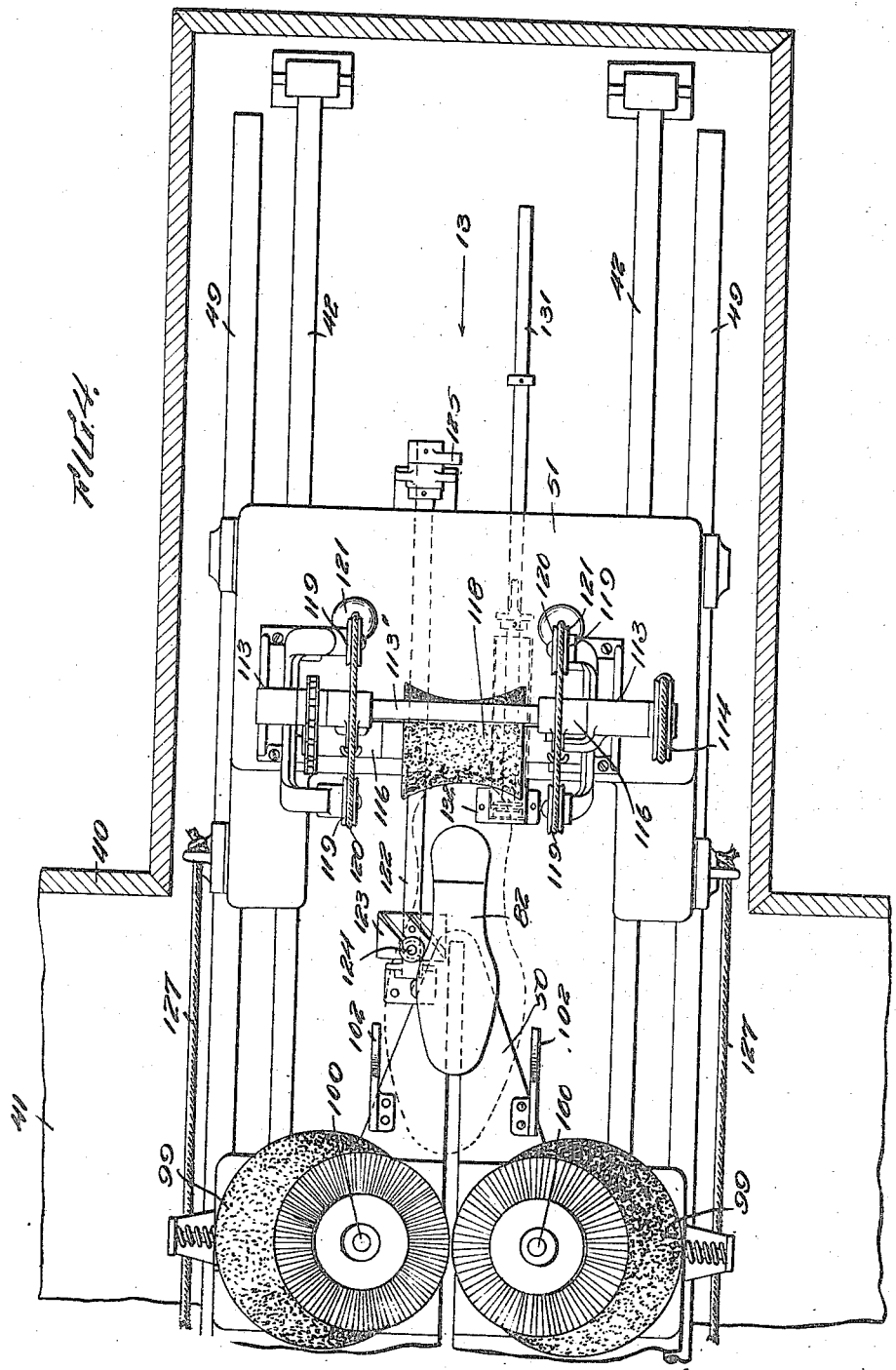

C. F. BURKHART.
SHOE CLEANING AND POLISHING MACHINE.
APPLICATION FILED JAN. 12, 1916.
1,196,658.
Patented Aug. 29, 1916.
12 SHEETS—SHEET 5.
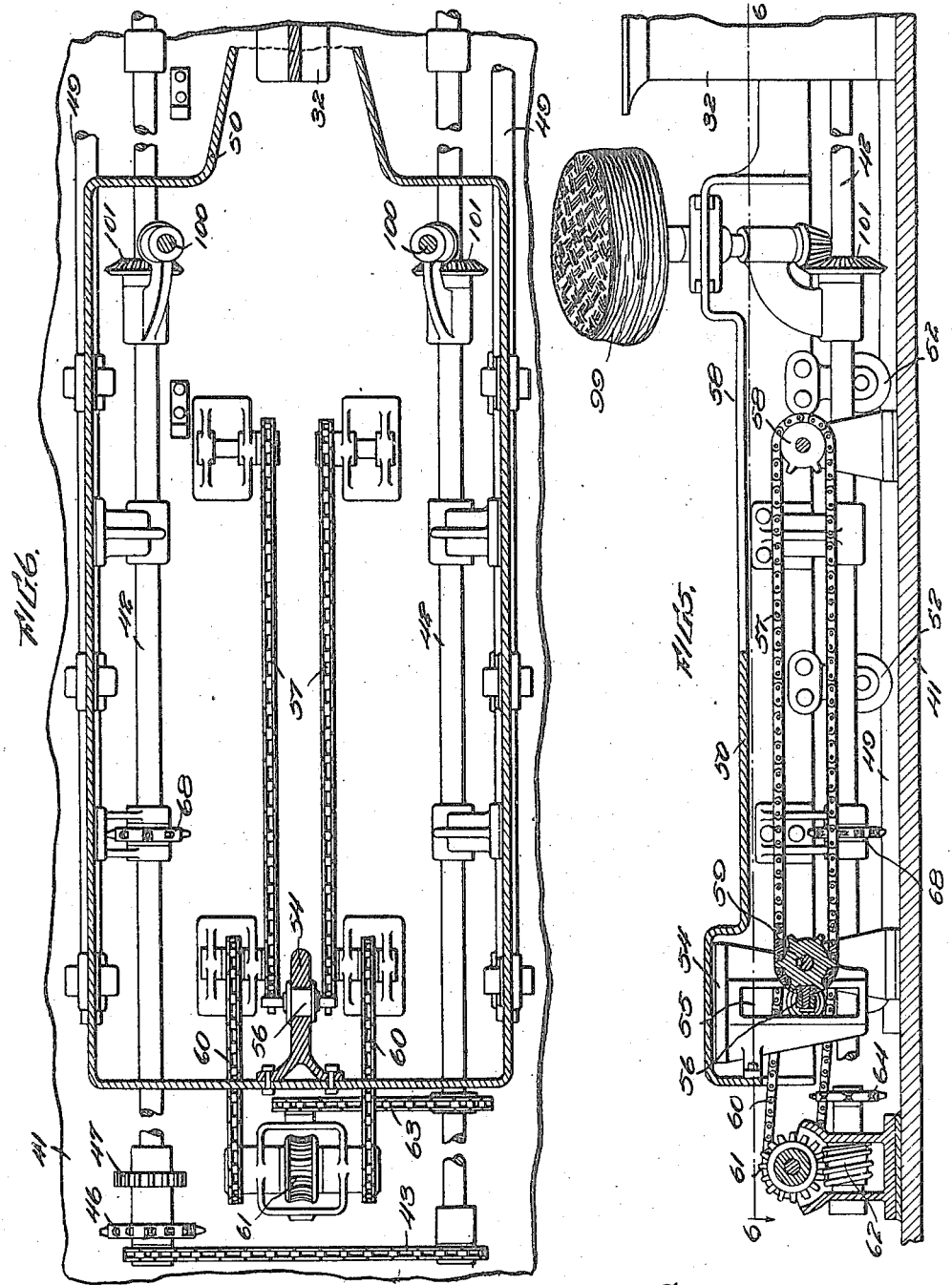

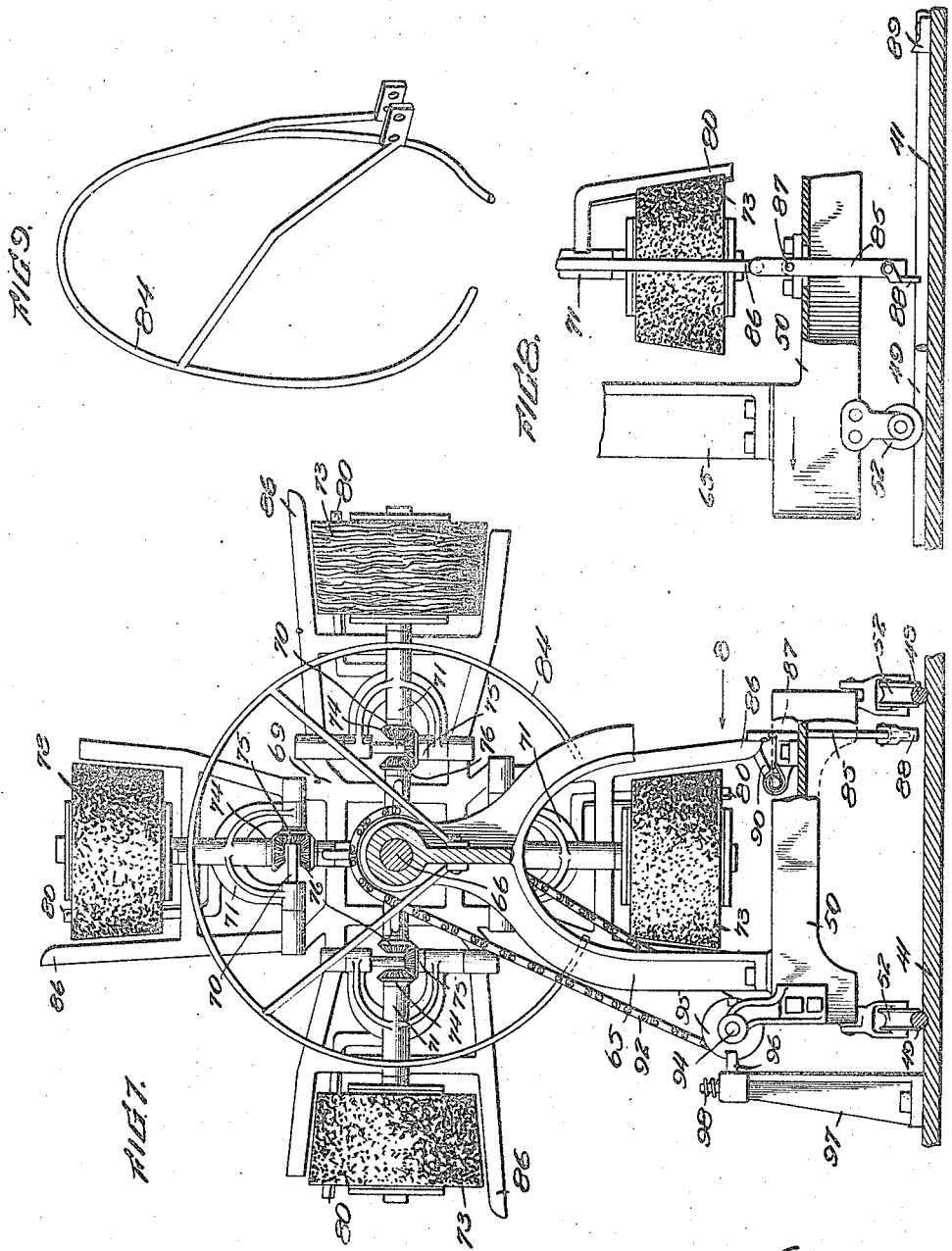

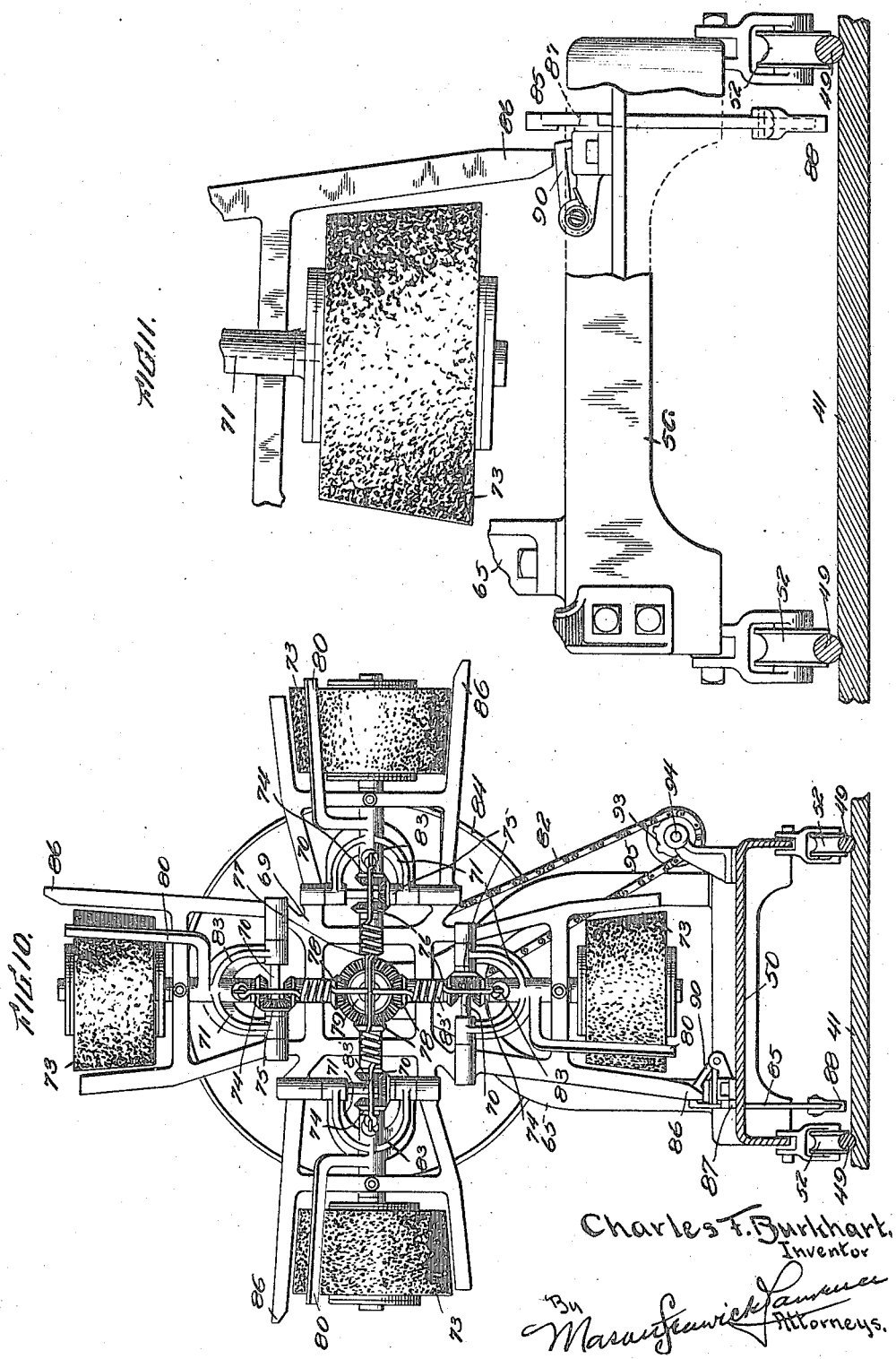

C. F. BURKHART.
SHOE CLEANING AND POLISHING MACHINE.
APPLICATION FILED JAN. 12, 1916.
1,196,658.
Patented Aug. 29, 1916.
12 SHEETS—SHEET 8.
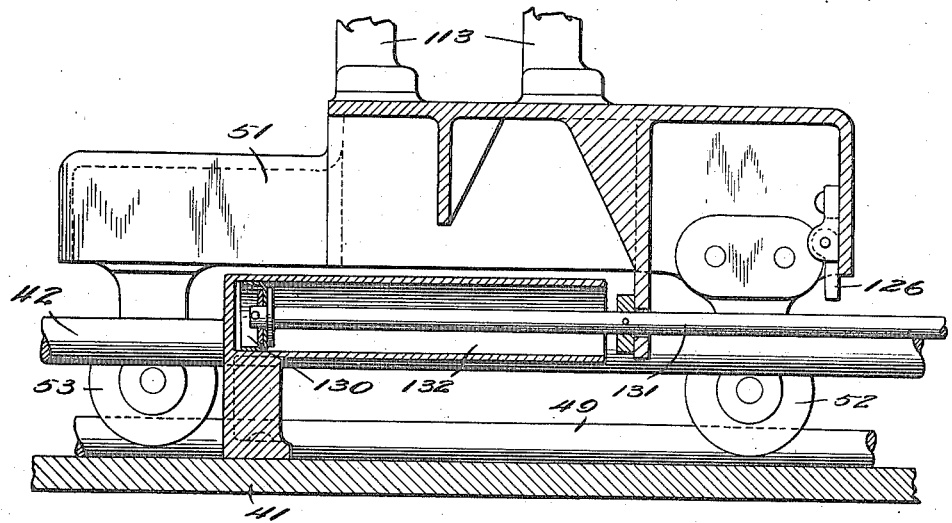
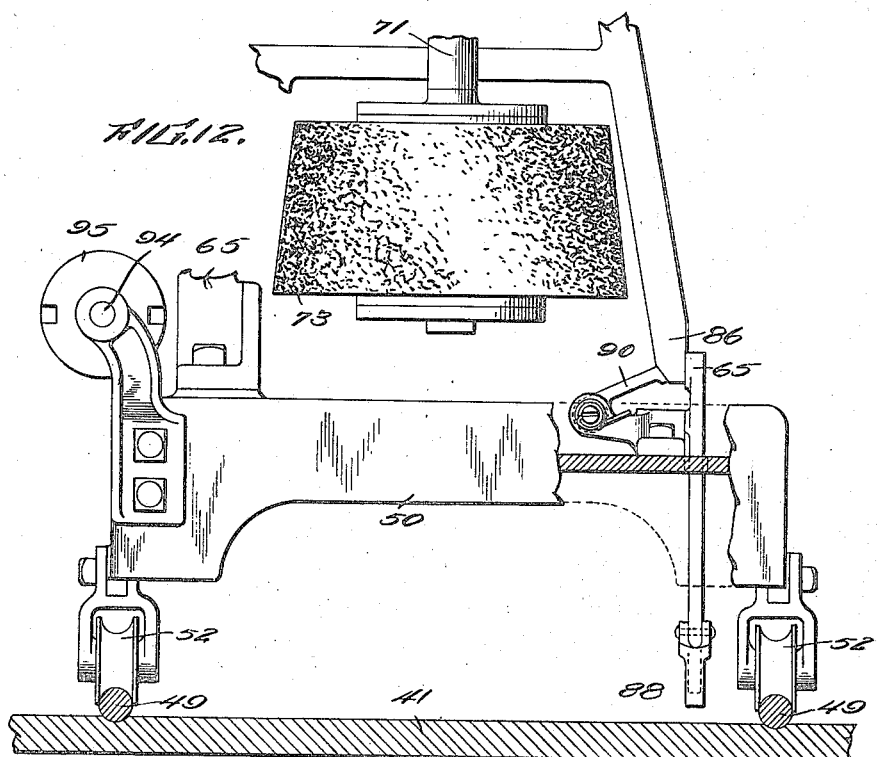

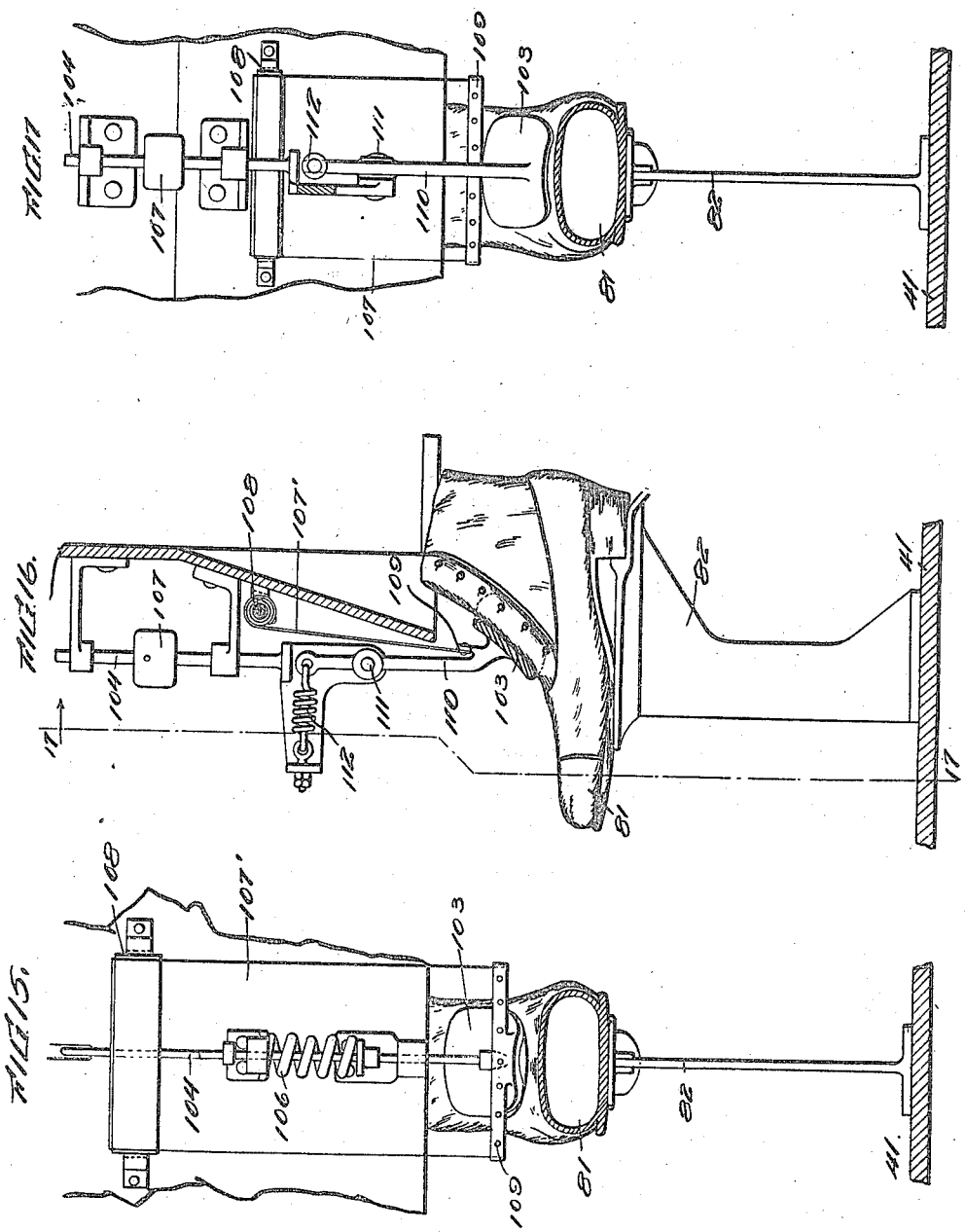

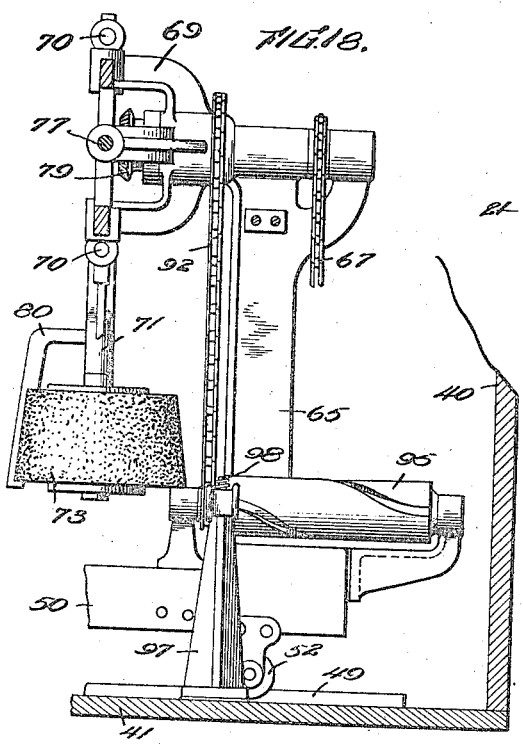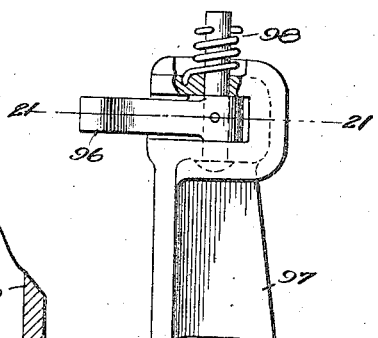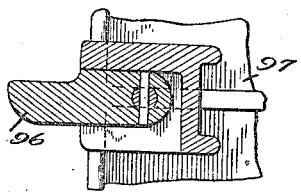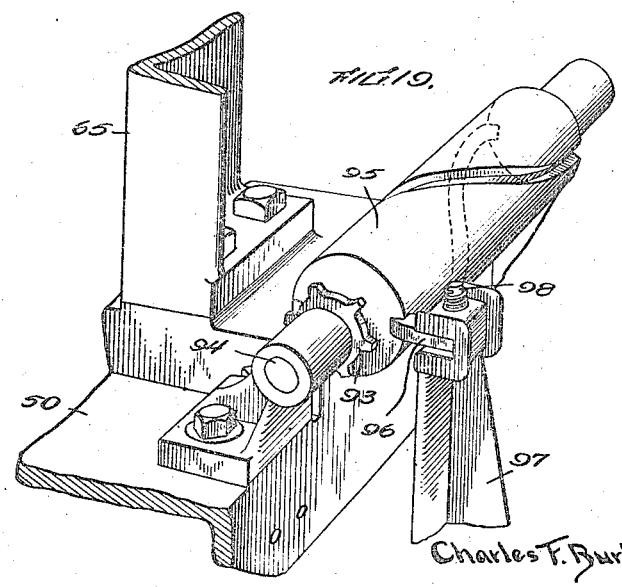

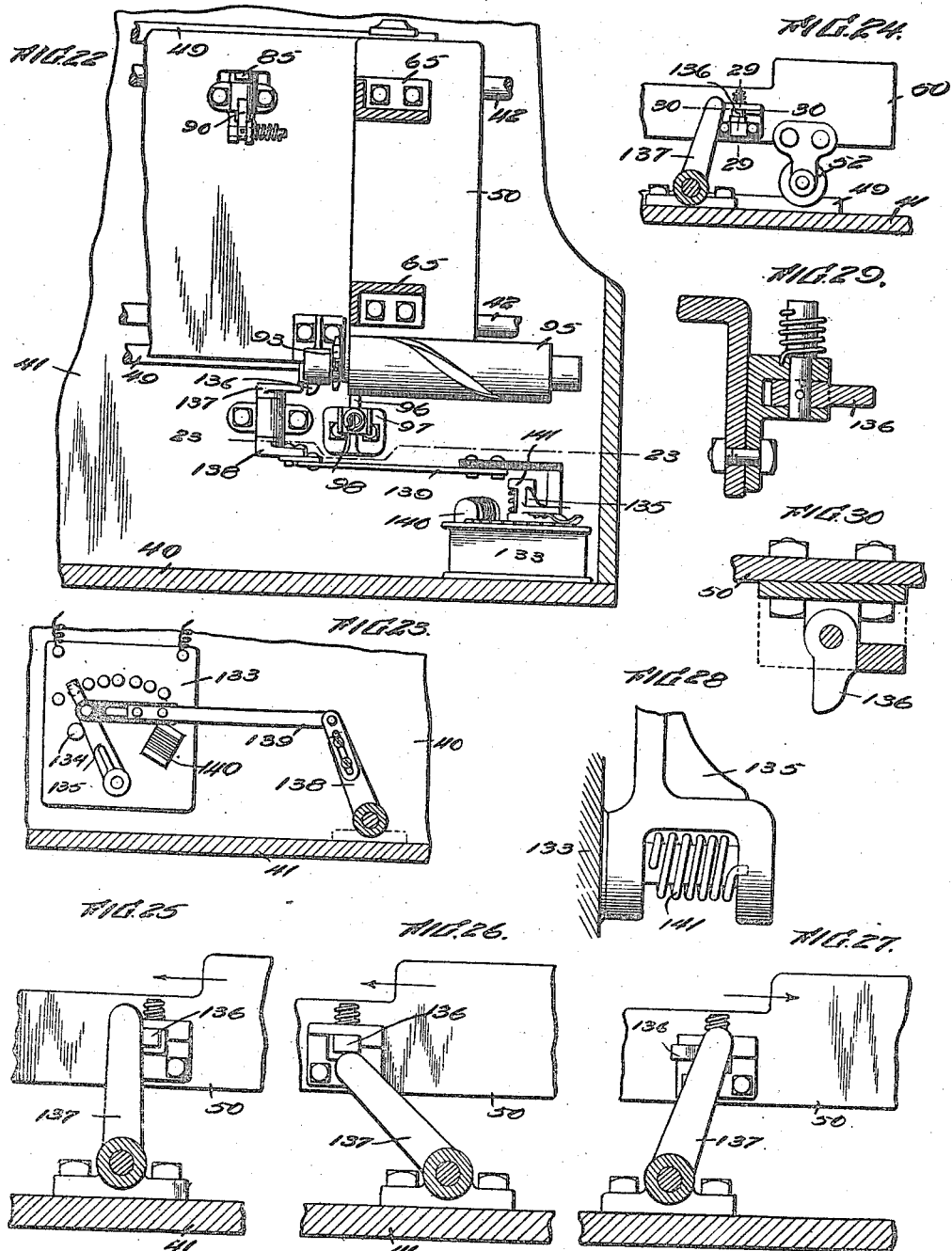

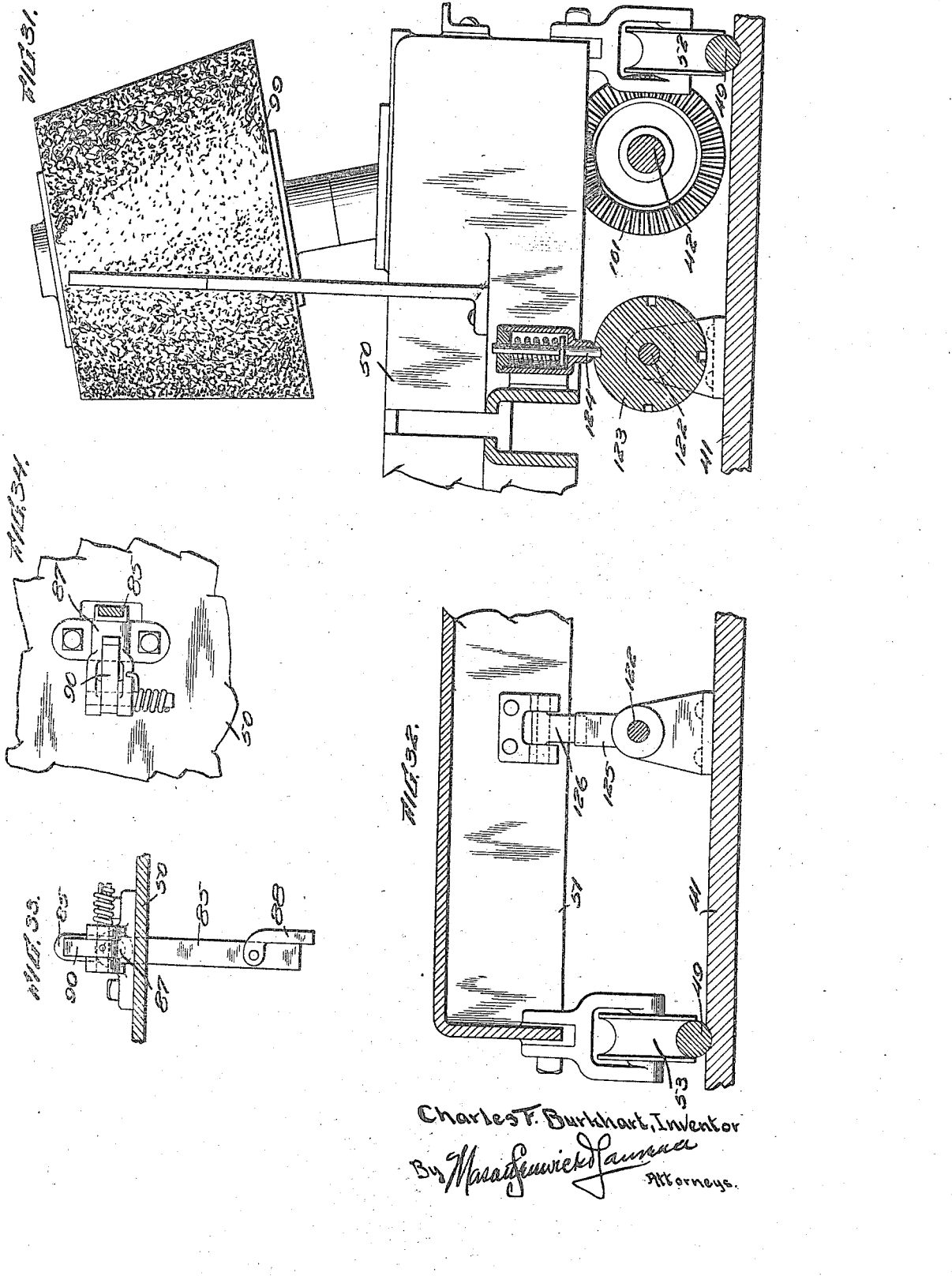

UNITED STATES PATENT OFFICE.

CHARLES F. BURKHART, OF PHILADELPHIA, PENNSYLVANIA, ASSIGNOR, BY MESNE ASSIGNMENTS, TO BURKHART CORPORATION, A CORPORATION OF NEW YORK.

SHOE CLEANING AND POLISHING MACHINE.

1,196,658.            Specification of Letters Patent.      Patented Aug. 29, 1916.

Substitute for application Serial No. 428,187, filed April 20, 1908. Renewed January 20, 1915, Serial No. 3,393. This application filed January 12, 1916. Serial No. 71,741.

*To all whom it may concern:*

Be it known that I, CHARLES F. BURKHART, a citizen of the United States, residing at Philadelphia, in the county of Philadelphia and State of Pennsylvania, have invented certain new and useful Improvements in Shoe Cleaning and Polishing Machines; and I do hereby declare the following to be a full, clear, and exact description of the invention, such as will enable others skilled in the art to which it appertains to make and use the same.

This invention relates to shoe polishing machines, and has for an object to provide an improvement on the machines disclosed in applications, Serial Number 335,310, filed Sept. 18, 1906, renewed December 21, 1915, Serial Nos. 68,100, 365,294, filed March 29, 1907, patented November 21, 1911, No. 1109220, and 377,209, filed June 4, 1907, patented March 30, 1909, No. 916,838, and is a substitute for application Serial Number 428,187, filed April 20, 1908, renewed January 20, 1915, Serial No. 3,393.

A further object of the invention is to provide in a shoe polishing machine a rotating frame carrying independently rotating brushes, and with improved means for holding the rotating brushes to their work.

A further object of the invention is to provide in a machine having a rotating brush-carrying frame improved means for moving the rotating frame with a step by step movement in timed relation with the operation of the machine and associated with improved means for maintaining the rotating frame in operative position.

A further object of the invention is to provide in a shoe dressing machine an improved adjustable guard adapted to protect portions of the shoe from being acted upon by the dressing and the polishing apparatus.

A further object of the invention is to provide in a shoe dressing machine a brush adapted to engage upon the heel and rear portion of a shoe and with improved means for advancing the brush to operative position and for rotating the same.

With these and other objects in view the invention comprises certain novel constructions, combinations and arrangements of parts as will be hereinafter described and claimed.

In the drawings:—Figure 1 is a view in vertical, longitudinal section showing the operative parts of the improved machine with the toe of the shoe being engaged by the toe polishing brush and the side polishing brush being adjacent the rear end of the shoe and the heel polishing brush out of operative position. Fig. 2 is a fragmentary, longitudinal, vertical, sectional view showing the side polishing brush adjacent the forward end of the shoe and the heel polishing brush in operative position. Fig. 3 is a vertical, longitudinal, sectional view showing the side polishing brush in operative position adjacent the toe end of the shoe and with the heel polishing brush out of operative position. Fig. 4 is a top plan view of the rear carriage and heel brush and of the side brushes positioned substantially as shown in Fig. 2 and taken on line 4—4 of such figure. Fig. 5 is a longitudinal, vertical, sectional view showing the means for operating the front carriage. Fig. 6 is a horizontal, sectional view of the front carriage-operating means taken on line 6—6 of Fig. 5. Fig. 7 is a view in front elevation of the rotating frame carrying the toe polishing brushes, taken on line 7—7 of Fig. 1. Fig. 8 is a fragmentary detail view in side elevation of the means for locking the rotating frame as seen on arrow 8 of Fig. 7. Fig. 9 is a view in perspective of the guide support for the brushes carried by the rotating frame, which said frame is shown in side elevation in Fig. 7 and in edge elevation in Fig. 1. Fig. 10 is a view in rear elevation of the rotating brush-carrying frame and associate parts, being the reverse to that shown in Fig. 7, and as seen on arrow 10 of Fig. 1. Fig. 11 is a detail broken view showing the frame locking means with the detent depressed and in position to permit the passage of the frame thereby. Fig. 12 is a view similar to Fig. 11 showing the rotating frame passed by the detent and locked in position. Fig. 13 is a view in rear elevation of the heel polishing brush and associate parts as seen along arrow 13 of Figs. 1, 2, 3 and 4. Fig. 14 is a view in side elevation showing in enlarged detail the heel polishing brush, the position being substantially the same as that shown in Figs. 1 and 3. Fig. 15 is an enlarged, detail, elevation of the adjustable foot guard and operating parts, with the transparent guard shown in front of the foot clamp. Fig. 16 is a vertical, sectional elevation of a modified form of the same, with the transparent guard shown in the rear of the foot clamp. Fig. 17 is a section taken on the plane indicated by line 17—17 of Fig. 16. Fig. 18 is a view in side elevation of a fragment of the rotating brush-carrying frame, showing the means for rotating the frame in timed relation to the operation of the machine. Fig. 19 is a perspective view of the worm cam employed for rotating the frame shown by Fig. 18. Fig. 20 is a view in side elevation of the spring-pressed detent employed for engaging and rotating the worm cam shown in perspective in Fig. 19. Fig. 21 is a detail horizontal, sectional view of the spring-pressed detent shown at and taken on line 21—21 of Fig. 20. Fig. 22 is a top plan view showing the rear portion of the front carriage and the worm cam shown at Fig. 19 and showing also in top plan the automatic means for throwing the lever of the controller. Fig. 23 is a view of the controller box shown conventionally in side elevation and taken on line 23—23 of Fig. 22. Fig. 24 is a view in side elevation of a fragment of the carriage and means for engaging the lever for throwing the controller arm. Fig. 25 is a view in side elevation of a fragment of the carriage showing the detent adapted to throw the controller arm, the arrow indicating the direction in which the carriage is moving. Fig. 26, is a view similar to Fig. 25 showing the controller arm in a different position, the arrow also indicating the direction of the movement of the carriage. Fig. 27 is a view similar to Figs. 25 and 26 with the controller arm in a different position, the arrow again indicating the direction of the movement of the carriage. Fig. 28 is a detail, side elevation of the controller arm pivot. Fig. 29 is a detail, vertical, sectional view of the detent carried by the carriage and adapted to engage the controller arm and taken on line 29—29 of Fig. 24. Fig. 30 is a detail, horizontal, sectional view of the controller arm engaging detent as shown on line 30—30 of Fig. 24. Fig. 31 is a view partially in elevation and partially in section of the means for actuating the rear carriage-retaining means. Fig. 32 is a detail view of the detent carried by the rear carriage and in engagement with the carriage retaining means. Fig. 33 is a view in side elevation of the arm adapted to lock the rotating frame against rotary movement during the operative period. Fig. 34 is a plan view in detail of the detent carried by the front carriage. Fig. 35 is a view in longitudinal, vertical section of the pneumatic cushion employed to prevent jar and breakage in the movement of the rear carriage.

Like characters of reference designate corresponding parts throughout the several views.

The improved shoe dressing machine forming the subject-matter of the present invention comprises preferably a casing 40 of any approved form, having a base 41 preferably substantially in the form of a platform which may be supported in any approved manner. Extending longitudinally of and journaled upon the base are preferably parallel shafts 42 rotating simultaneously by reason of intergearing in any approved manner as by sprocket chain 43, Fig. 6, connecting sprockets upon or adjacent the ends of such shafts. The shafts receive motion from any approved source as the motor shown conventionally at 44 and by any approved transmission means as the sprocket chain 45 engaging the sprocket 46 carried upon the shaft with the gear wheel 47, the latter intergearing with the gear 48 upon one of the said shafts 42 as shown in Fig. 1.

Extending longitudinally of the machine and also secured upon the base 41 are parallel tracks 49, Fig. 6, upon which are mounted to move a front carriage 50 and a rear carriage 51, the former upon wheels or rollers 52 and the latter upon wheels or rollers 53.

The front carriage 50 is reciprocated longitudinally of the platform 41 upon the tracks 49 by means of a bracket 54, Figs. 5 and 6, having a slot 55 formed therein, and engaging upon a roller 56, the terminals of the shaft of which are secured to sprocket chains 57 which, in turn, pass over sprockets 58 and 59. The sprockets 59 receive motion from sprocket chains 60, which, in turn, receive motion from a worm gear 61, engaging a worm 62 driven by means of a sprocket chain 63 engaging at one end with a sprocket on one of the shafts 42 and at its opposite end the sprocket 64 connected with the worm 62. It will thus be seen that as the shafts 42 are driven from the motor 44 the gear 61 is driven from the worm 62 and the sprocket chains 57 are caused to rotate over the sprockets 58 and 59 and to move the roller 56 in a planetary orbit, carrying therewith the bracket 54 and consequently the carriage 50.

Upon the carriage 50 is mounted an upright 65, upon which is journaled a shaft 66, positioned longitudinally of the machine, and driven by means of a sprocket chain 67, engaging upon a sprocket 68, Figs.

1 and 5, splined upon one of the shafts 42 and movable with the carriage. The frame 69 is provided with journal bearings about its peripheral line in such manner that shafts 70 journaled therein form substantially a square with opposite members of the pairs in parallelism, as shown in Fig. 10. Upon the shafts 70 are pivoted auxiliary frames 71 substantially as disclosed in the aforesaid co-pending application #335,310.

The auxiliary frames 71 are provided with shafts 72 journaled therein and extending substantially radially relative to the shaft 66 and carrying brushes 73 of any approved material and construction and substantially similar to the brushes described in the said last-mentioned co-pending application. The shafts 72 carrying the brushes 73 are driven by means of beveled gears 74 mounted upon the said shafts 72 and interengaging with beveled gears 75 upon shafts 70 which latter are, in turn, driven by beveled gears 76. The beveled gears 76 are mounted upon shafts 77 journaled in the frame 69 and in turn provided with beveled gears 78 interengaging with a gear 79 carried upon the shaft 66. It will thus be seen that as the shaft 66 is driven by the sprocket chain 67 the frame and its associate parts are rotated therewith, unless such frame is held against rotation in some manner. When the frame is held rigid, the shaft 66 continuing to rotate, rotates within the frame 69 and the gear 79 then by means of the several beveled gears, forming a train therefrom, rotates the brushes 73 independently upon their axes, as described in the said application #335,310 now 68,100. It will be noted that, as shown particularly in Fig. 10, one pair of opposed brushes are rotated together by reason of the driving shaft 77 extending across the axis of shaft 66. The construction shown is not necessary to the successful operation of the device but is found to be desirable as tending to more thoroughly clean the toe of the shoe being operated on.

The auxiliary frames 71 are each provided with a guard 80 positioned to prevent the shoe being operated upon from being pushed to one side by the rotary action of the brushes and as the pair of brushes just mentioned are shown as operating in opposite directions, it will be noted that the guards 80 upon those brushes are disposed upon opposite sides of said brushes and upon the side to which the adjacent side of the brush is moving.

As described in co-pending application #335,310, the carriage, as it moves forward, brings the brushes 73 into position for engaging the shoe 81 upon the foot rest 82 and by reason of the joint formed by the shafts 70 the auxiliary frames carrying the brushes are capable of an independent movement upon the engagement of the brush with the shoe. By the rotary movement of the brushes 73 they are held in engagement with the shoe 81 and under some conditions it is found desirable to lessen such frictional engagement, and for such purpose any convenient and approved means are employed as the weights 83 which tend to hold the lower brush or the one in operation upon the shoe away from the shoe. Under other conditions it is found desirable to increase the frictional tension of the brushes upon the shoe, and springs 83' are therefore provided, connecting opposite brushes. When the brushes are at the top or opposite the point of engagement upon the shoe it is found that at times they are inclined to fall backwardly, especially in view of the action of the driving gear. To hold such brushes yieldingly in proper position a resilient guard 84, Fig. 9, is provided rigidly secured to the upright 65 and forming substantially the greater part of a circle in front of the brushes and positioned to be engaged by the auxiliary frames 71. At the lower points or adjacent the point of engagement with the shoe the guard is interrupted so that as the carriage advances the brush may be, by engagement with the shoe, forced forwardly between the interrupted ends of such guard as required by the size and position of the shoe.

As heretofore noted when the frame 69 is free to rotate such rotary movement is insured by the action of the sprocket chain 67 and such rotary movement occurs when the frame is advanced forwardly or out of operative position upon the shoe. The frame is normally held against rotation by means of an arm 85 upstanding in the path of a finger 86 extending rigidly beyond each of the auxiliary frames 71. The arm 85 is pivoted upon the carriage 50 as at 87. At the lower end the arm 85 is provided with a yielding finger or trip 88 positioned to engage a stationary abutment 89 carried upon the base 41 and to operate the arm 85 when the carriage 50 is advancing in the direction shown by the arrow in Fig. 8 but to pass over such abutment 89 without moving the arm when the carriage moves in the opposite direction.

To prevent the frame 69 and auxiliary frame 71 from rebounding when the finger 86 strikes and engages the upper end of the arm 85, a spring-pressed detent 90 is employed positioned to permit the passage of the finger 86 thereover, as shown in Fig. 11, but to engage in the rear of and maintain the finger 86 against rebounding as soon as it has passed the same as shown in Fig. 12. It will thus be seen that after each complete reciprocation of the carriage the movable abutment 88 engages the stationary abutment 89, and releases the finger 86 permitting the frame carrying the brushes to rotate a quarter of a revolution and until the succeeding finger 86 again engages the arm 85.

To provide a positive rotation of the frame 89 and its associated auxiliary frame 71 and parts carried thereby, a sprocket 91 is mounted upon the frame and a sprocket chain 92 passed thereover and with its opposite end passed over a sprocket 93 upon a shaft 94, Fig. 19, which, in turn, carries a worm cam 95. The worm cam 95 is in position to have its spiral grooves engaged by a finger 96 carried upon an upright 97 erected adjacent the path of movement of the carriage 50. The finger 96 is controlled by a spring 98 to hold the finger 96 in proper position for engaging and rotating the worm cam 95 as the carriage 50 moves forward or away from the shoe but to pass over the cam upon the return movement. It will thus be seen that as the carriage starts forwardly or away from the shoe and after amply clearing the same, the yielding finger 88 engages the stationary abutment 89 releasing the frame and at the same time the worm cam 95 is brought into engagement with the finger 98, and a positive rotation of the frame thereby insured, making it not necessary to depend upon the rotation produced by the rotation of the shaft 66. Mounted upon the carriage 50 are also spaced side brushes 99 carried upon shafts 100 set normally at an inclination but movable radially and angularly about the shafts 42, from which they receive motion by means of the beveled gears 101 splined upon the shaft as disclosed in co-pending application No. 335,310, and guides or guards 102 are carried by the carriage 50 to properly position the foot and shoe with relation to the foot rest, so that the brushes will uniformly operate upon the shoe.

To maintain the shoe in proper position upon the foot rest a guard or clamp member 103 is employed preferably mounted upon a rod or shaft 104 terminating in a handle or knob 105 externally of the machine and in position for convenient access by the operator. The guard is maintained in position upon the foot by means of a spring 106, as shown in Figs. 1, 2 and 3, or by its equivalent as a weight 107, shown in Figs. 16 and 17. A guard 107' is also employed to prevent soiling the clothing by spattering dressing thereon, such guard being in the nature of a flexible and preferably transparent curtain rolled upon a spring roller 108 and secured to the clamping member 103 in any approved manner as by the cross-head 109. It will thus be seen that when the clamping member 103 is raised by the manipulation of the knob 105, the flexible curtain is wound upon the roller 108 and when the clamping member 103 is permitted to return to clamping position upon the shoe, the curtain follows therewith and forms a screen between the foot and the dressing applying apparatus. Instead of employing the spring as shown in Figs. 1, 2 and 3, the clamping member 103 may be carried upon an arm 110 pivoted as at 111 and provided with a spring 112 to exert the desired tension and clamping resistance as seen in Figs. 16 and 17.

Upon the carriage 51 uprights 113 are erected forming a journal for a shaft 113'' positioned transversely of the machine and receiving movement by means of a band or sprocket chain 114 which in turn receives motion from a pulley or sprocket 115, Fig. 3, splined upon one of the shafts 42 and movable longitudinally of such shaft with the carriage 51. Pivoted upon the shaft 113'' is a frame 116 forming journals for the shaft 117 upon which is secured the heel brush 118 substantially as described in said co-pending application #335,310. To hold the heel brush yieldingly in operative position pulleys 119 are provided over each of which passes a cord or cable 120, each provided at its end with a weight 121 which serves to hold the brush yieldingly substantially in the position shown in Fig. 14. It will be noted from such figure that the brush is normally below the center upon which the frames 116 are pivoted so that when the brush 118 strikes the shoe upon which it is to operate, it is capable of moving downwardly against the tension of the weight 121 as shown in Fig. 2.

The frame 116 is provided with fingers or noses 116', each being proportioned and positioned to engage an abutment 113', carried by the uprights 113 and these abutments limit the downward and rearward movement of the frame 116 and the heel brush 118 carried thereby so that the brush will not be passed beyond the point where it will be retracted by the weights 121, and also serve the purpose of exerting pressure upon the brush to insure greater frictional engagement between the brush and the heel of the shoe.

The carriage 51 is moved rearwardly out of position for operation upon the shoe, by being engaged by the carriage 50 as shown in Fig. 1, so that as the carriage 50 moves rearwardly the rear end of the carriage 50 engages the carriage 51 before the side brushes 99 engage the heel brush 118, so that as the side brushes move to the rear end of the shoe, the heel brush is moved backwardly out of operation. Centrally of the platform 41 a shaft 122 is journaled and carries a worm cam 123 positioned in the path of movement of the engaging finger 124 carried by the carriage 50, whereby an intermittent rotary movement of the shaft 122 is provided by the reciprocation of the carriage 50, such movement being provided by reason of the fact that the finger 124 is yielding and spring-pressed, and the cam 123 is provided with spiral slots and intermediate slots extending in parallelism with its axis, the latter slots being inclined as shown more particularly at Fig. 3 whereby the spring-pressed finger 124 rides upward along said incline and passes completely over the cam 123, engaging the spiral grooves on its return. The shaft 122 carries a finger 125 positioned to at times engage with a gravity-operated pawl 126. When the finger 125 is in position for engagement by the pawl 126, the carriage 51, upon being forced backwardly by the carriage 50 causes the pawl 126 to pass over the finger 125 and to engage in the rear thereof and maintain the carriage 51 against forward movement when the carriage 50 moves forwardly. This is at the fourth reciprocation of the carriage 50 to hold the heel brush out of engagement to permit the insertion and withdrawal of the foot. As soon as the carriage 50 moves forwardly the worm cam 123 is engaged and the detent 125 moved rotatably which permits the carriage 51 to be released therefrom. To move the carriage 51 forwardly to bring the heel brush into engagement, any approved means is employed, as the cable or cords 127 passing over pulleys 128 and actuated by weights 129. When the carriage 51 is released from the detent 125 it is free to move forward without restriction and to prevent jar and undue force in striking the shoe, the carriage is provided with a plunger 130 carried upon a rod 131 and positioned to enter cylinder 132 and to form thereby an air cushion to cushion the forward movement of the carriage 51, as shown in Fig. 35.

The construction here shown is designed to be operated by electric motor shown conventionally at 44 and a controlling box 133 of any usual and ordinary type is also provided. A pin 134 is provided to prevent the switch arm 135 from at any time completely cutting off the current as particularly shown in Fig. 23. As shown the switch arm rests normally at one point so that when the starting switch is manually or otherwise actuated current is supplied to the motor thereby. The motor is thereby started and the carriage 50 moving forward, the detent 136 engages a lever 137 and by means of the lever 138 carried thereby and the link 139 the switch 135 is moved until the switch arm is in engagement with the electromagnet 140 in which position it is held as long as current passes through the magnet. By reason of the formation of lever 137 and the position of the parts the detent passes in both directions over the lever 137 without returning the switch arm to normal position. The switch arm is provided with a spring 141 so that when the current is finally broken and the electromagnet 140 deënergized, the spring 141 returns the arm to normal position.

It will thus be seen that in operation current is established in any approved manner as by coin-controlled or any switch operation, thereby furnishing current to the motor through the switch arm positioned as shown in Fig. 23. This starts the motor slowly and gradually, and the carriage 50 starts thereby forwardly. The movement of the carriage 50 throws the switch arm 135 gradually forward to supply the full current to the motor, thereby putting the machine in full operation. The electromagnet 140 maintains the switch in such position until the circuit is broken.

The movement of the carriage 50 moves the side brushes 99 against and along the sides of the shoe and brings one of the brushes 73 into engagement with the toe of the shoe. Such forward movement also brings the engaging finger 124 into engagement with the worm cam 123 thereby rotating the shaft 122 and releasing the carriage 51. The carriage 51, then under the impulse of the weights 129, moves forwardly and the heel brush engages the heel and rear portion of the shoe.

The blacking distributing means is carried upon the carriage 50 and is movable therewith and applies blacking in the form of a spray to the shoe as the spraying means passes by the shoe rest. At each reciprocation of the carriage 50 the side brushes 99 are moved along the opposite sides of the shoe resting upon the rest to clean the sides of the shoe and the toe brush, being one of the brushes 73, is brought into engagement with and cleans the toe of the shoe. As the carriage 50 reciprocates the frame 69 and the several brushes 73 carried thereby are rotated so that the brushes 73 are brought successively into operative relation with the toe of the shoe. To complete the operation upon a shoe four complete reciprocations of the carriage 50 are required thereby completely rotating the frame 69 and bringing each of the four brushes 73 successively into operation upon the shoe.

As the operation is begun by the front carriage 50 starting rearwardly the rear carriage 51 is released and under the action of the weights 129 moves rapidly forward checked only by the air cushion above described and into operative contact with the heel of the shoe. It will thus be seen that the rear of the shoe is first acted upon or is acted upon almost simultaneously with the beginning of action by the side brushes 99. As the front carriage moves rearwardly it engages the rear carriage 51 and moves it rearwardly moving thereby the heel brush 118 out of engagement with the heel of the shoe, the side brushes moving along the sides of the shoe and past the heel to the position shown approximately in Fig. 1 and moving the toe brushes into engagement with the shoe. As the front carriage moves forwardly again the side brushes move along the sides of the shoe cleaning or polishing the sides in their forward movement and the rear carriage, under the action of its weights, also moves forward to bring the heel brush again into engagement with the heel of the shoe, whereby the heel brush is brought twice into engagement with the heel of the shoe at the first complete reciprocation of the front carriage. Upon each return movement of the front carriage the rear carriage is moved out of engagement with the heel of the shoe and a different one of the brushes 73 brought into engagement with the toe. It is thus seen that each portion of the shoe is acted upon four separate times, the action upon the sides and heel being by the same brushes, while different toe brushes are employed at each reciprocation of the carriages. At the required movement of the front carriage at its fourth reciprocation the pawl 126 is engaged by the detent 125 to maintain the rear carriage at the extreme of its rearward movement and prevent its engagement with the shoe as the front carriage moves forwardly. When the front carriage has moved forwardly to remove the side brushes and toe brushes entirely from contact with the shoe, the operation is completed. The foot guard is then raised by manipulating the handle 105, the transparent curtain 107 being automatically rolled upon its roller as the guide or guard is lifted and the foot is removed.

I claim:—

1. In a shoe dressing machine, a reciprocating carriage, shoe cleaning and polishing means mounted on said carriage, a shaft mounted to rotate adjacent the carriage, a pivoted detent carried by the carriage, a finger carried by the shaft and positioned to rotate into the path of movement of the detent and hold the carriage against movement, and means to intermittently rotate the shaft.

2. In a shoe dressing machine, a reciprocatingly driven carriage, shoe cleaning and polishing means mounted in said carriage, an auxiliary carriage mounted to reciprocate, a shaft mounted to rotate adjacent both carriages, a pivoted pawl carried by the auxiliary carriage, a detent carried by the shaft positioned to rotate into the path of movement of the pawl, and means carried by the driven carriage adapted to move the shaft at each reciprocation with a step by step movement.

3. In a shoe dressing machine, a rotatable main frame, auxiliary frames pivoted upon the main frame, brushes carried by the auxiliary frames and rotatable independently of such frames, and means connecting opposite pairs of brushes to yieldingly hold said brushes in frictional engagement with the shoe.

4. In a shoe dressing machine, a rotatable main frame, auxiliary frames pivoted upon the main frame, brushes carried by the auxiliary frames and rotatable independently of, and upon axes perpendicular to the axis of rotation of the main frame, and guards carried by the auxiliary frames adjacent to the brushes.

5. In a shoe dressing machine, a rotatable main frame, auxiliary frames pivoted upon the main frame, brushes carried by the auxiliary frames on axes perpendicular to the axis of rotation of the main frame, and guards carried by the auxiliary frames adjacent to but at one side of the adjacent brushes.

6. In a shoe dressing machine, a reciprocating carriage, a rotatable brush-carrying frame carried by said carriage, a helicoidal cam carried by said carriage, means connecting the cam and frame, and means to at times engage the cam to cause a rotary movement of the cam upon reciprocation of the carriage.

7. In a shoe dressing machine, a foot rest, a carrying member, rotary side brushes mounted on the carrying member disposed adjacent the foot rest, and guides carried adjacent and moving with the brushes and positioned to prevent lateral movement of a foot positioned upon the rest.

8. In a shoe dressing machine, a foot rest, a carriage mounted to reciprocate in the rear of the foot rest, a horizontally journaled vertically swinging brush carried by the carriage, and means to impart rotary movement to the brush.

9. In a shoe dressing machine, a foot rest, a rotatably mounted horizontally disposed auxiliary brush in the rear of the foot rest, means to impart rotary motion to the brush, and means to permit a bodily yielding movement of the brush in a vertical plane, and for returning it to normal position.

10. In a shoe dressing machine, a foot rest, a rotatably mounted, horizontally disposed brush, means to move the brush toward and away from the foot rest, means to rotate the brush, and means to permit a bodily yielding movement of the brush in a vertical plane, and for returning it to normal position.

11. In a shoe dressing machine, a foot rest, a frame disposed in the rear of the foot rest, a horizontally journaled brush carried by the frame, means to move the frame and brush toward and away from the rest, means to impart rotary motion to the brush, and means permitting yielding movement of the brush in a vertical plane and for returning it to normal position.

12. In a shoe dressing machine, a foot rest, a carriage mounted to reciprocate in the rear of the foot rest, a swinging frame carried by the carriage, a rotatable brush mounted on the frame, means to reciprocate the carriage relative to the foot rest, means to transmit rotary motion to the brush, and means permitting a downwardly and rearwardly yielding movement of the brush relative to the carriage and for returning it to normal position.

13. In a shoe dressing machine, a foot rest, a carriage mounted to reciprocate in the rear of the foot rest, an upright frame carried by the carriage, an auxiliary frame pivoted upon the upright frame, means to hold the auxiliary frame normally and yieldingly in approximately a horizontal plane, but capable of swinging in a vertical plane, a brush horizontally journaled upon the auxiliary frame, and means to impart rotary movement to the brush.

14. In a shoe dressing machine, a foot rest, a plurality of shafts journaled adjacent the foot rest, a carriage mounted to reciprocate adjacent the shafts, means operated by one shaft to drive the carriage, means carried by another shaft to engage and prevent movement of the carriage at predetermined intervals, means to drive the shafts in timed relation, a brush mounted to rotate on the carriage, and means to transmit rotary motion from another of the shafts to the brush.

15. In a shoe dressing machine, a rotatable main frame, auxiliary frames pivoted upon the main frame upon pivots transverse to the axis of the main frame, brushes carried by the auxiliary frames, and a guard disposed adjacent the main frame and positioned to prevent tilting of the auxiliary frames and having an aperture to permit free swinging movement of the auxiliary frames at one point in their rotation of the main frame.

16. In a shoe dressing machine, a reciprocating carriage, an upright carried by the carriage, a frame journaled upon the upright, brushes pivotally supported by the frame, and a guard carried by the upright positioned to support the brushes when inoperative but to permit free swinging of the brushes when in operation.

17. In a shoe dressing machine, a reciprocating carriage, an upright carried by the carriage, a rotatable frame journaled upon the upright, brushes carried by the frame normally perpendicular to the axis of the frame, and a guard carried by the upright positioned to support the brushes in substantially such perpendicular position and having an interrupted portion to permit free swinging of the brushes in operation.

18. In a shoe dressing machine, a reciprocating carriage, an upright carried by the carriage, a frame journaled upon the upright on a horizontal axis, auxiliary frames carried by the main frame and movable yieldingly relative thereto, brushes carried by the auxiliary frames, and a guard carried by the upright in front of and positioned to support the auxiliary frames against tilting in one direction.

19. In a shoe dressing machine, a reciprocating carriage, an upright carried by the carriage, a horizontal shaft journaled in the upright, a main frame carried by the shaft, auxiliary frames pivoted to the main frame, and each movable yieldingly upon a pivot transverse to the axis of the main frame, brushes carried by the auxiliary frames, means to transmit rotary motion from the shaft to the brushes, and a guard carried by the upright in front of and positioned to support the auxiliary frames against tilting in one direction.

20. In a shoe dressing machine, a reciprocating carriage, an upright carried by the carriage, a frame mounted to rotate upon the upright upon a horizontal axis, means to maintain the frame against rotary movement, a cam carried by the carriage, means to at times impart a rotary motion to the cam, means to transmit rotary motion from the cam to the frame, and means to release the frame in timed relation to the movement of the cam.

21. In a shoe dressing machine, a reciprocating carriage, an upright carried by the carriage, a horizontal shaft journaled upon the carriage, a frame carried by the upright, shoe cleaning and polishing means carried by the frame, means to maintain the frame against rotary movement, means to transmit rotary motion from the shaft to the shoe cleaning and polishing means, a cam carried by the carriage, means to at times impart a rotary motion to the cam, and means to transmit rotary motion from the cam to move the frame independently of the movement of the shaft.

22. In a shoe dressing machine, a reciprocating carriage, an upright carried by the carriage, a horizontal shaft journaled upon the upright, a frame carried by the upright and rotatable thereon, brushes carried by the frame, means to transmit rotary motion from the shaft to the brushes, means to maintain the frame against rotary movement, means to at times release the retaining means, a rotatable cam carried by the carriage, transmission means connecting the cam and frame, and means to impart a rotary motion to the cam when the retaining means is released.

23. In a shoe dressing machine, a reciprocating carriage, a brush-carrying frame mounted to rotate upon the carriage, a worm cam carried by the carriage, a stationary upright mounted adjacent the path of movement of the worm cam, means carried by the upright adapted to engage and impart rotary movement to the worm cam, and means to transmit rotary motion from the worm cam to the brush-carrying frame.

24. In a shoe dressing machine, a reciprocating carriage, a horizontal shaft journaled upon the carriage, a helicoidal cam carried by the shaft, a stationary upright mounted adjacent the path of movement of the cam, a spring-pressed finger carried by the upright and positioned to engage the cam, a brush-carrying frame mounted on the carriage, and means to transmit rotary motion from the cam to the frame.

25. In a shoe dressing machine, a reciprocating carriage, a horizontal shaft journaled upon the carriage, a helicoidal cam carried upon the shaft, a stationary upright erected adjacent the path of movement of the cam, a yielding detent carried by the upright and positioned to engage with the cam, an upright carried by the carriage, a shaft journaled horizontally upon the upright, a frame mounted upon the shaft and movable independently thereof, brushes carried by the frame, means to transmit rotary movement from the last-mentioned shaft to the brushes, and means to transmit rotary movement from the cam to the frame.

26. In a shoe dressing machine, a shoe support, a reciprocating carriage carrying rotatable shoe cleaning and polishing means and foot guides adapted to move therewith adjacent the sides of the support.

27. In a shoe polishing machine, the combination with a movably mounted carriage and means for moving the same, of a brush carried thereby, a cam carried by said carriage and adapted to move said brush into and out of operative position, and means fixed with respect to the carriage and adapted to engage and actuate the cam.

28. In a shoe polishing machine, the combination with a movably mounted carriage, of a brush journaled thereon and adapted to revolve bodily about an axis independent of its journal axis, a cam carried by the carriage, and means transmitting motion from the cam adapted to revolve said brush.

29. In a shoe polishing machine, the combination with a movably mounted carriage, means for moving the same, a rotary brush carried by said carriage and capable of planetary movement, and a cam geared to move the brush in its orbit.

30. In combination a movably mounted carriage, means for moving the same, a shaft carried by said carriage, a brush frame journaled to revolve about said shaft, brushes carried by the frame and geared to the shaft and adapted to be rotated thereby, a cam geared to the frame and adapted to rotate the frame, and means for rotating the cam relative to the carriage.

31. In combination, a reciprocating carriage, means for moving the same, a shaft journaled on the carriage, a brush frame journaled to revolve about the shaft, brushes carried by said frame and geared to be rotated by said shaft, and means geared to the frame and adapted to revolve the same a distance equal to the distance between two of the brushes for each complete reciprocation of the carriage.

32. In combination, a reciprocating carriage, a cam sustained thereby, a pawl fixed against movement in one direction and free to swing in the opposite direction and extending into the path of the cam for actuating the same during one movement of the carriage of each reciprocation thereof, a revolving brush frame sustained by the carriage and geared to the cam and adapted to be actuated thereby, rotary brushes sustained by said frame, and means for rotating said brushes.

33. In combination, a movably mounted revoluble frame, means for revolving the same, a plurality of rotary brushes pivoted to swing in said frame, means for rotating said brushes, and a guard rail disposed in the rear of the brushes for limiting rearward swinging thereof.

34. In combination, a revolubly mounted brush frame, brushes pivotally supported thereby and adapted to swing therein, means for rotating said brushes, means for revolving said frame, and a guard rail disposed for limiting the swinging of the brushes in one direction, the ends of the guard rail being spaced apart for permitting such swinging at one point.

35. In combination, a standard, a brush frame journaled to revolve thereon, rotary brushes pivotally carried by said frame and adapted for swinging movement, a guard disposed contiguous to the brush frame for limiting the swinging of said brushes in one direction, brace rods connected with the said standard and with the guard for supporting the guard, the guard being interrupted for permitting swinging of the brushes at one point, and means for rotating the brushes.

36. In combination, a revolubly mounted frame, means for revolving the same, rotary brushes pivotally carried by said frame and adapted to swing, means for rotating said brushes, and weights connected to the brushes to lessen the frictional contact of the brushes with a shoe.

37. In combination, a revolubly mounted frame, sleeves pivotally carried by the frame and adapted to swing therein, shafts journaled in said sleeves, a brush carried by each of said shafts, and a weight projecting from each of said sleeves in one direction of swing thereof, to lessen the frictional engagement of a brush with a shoe.

38. In combination, a foot rest, a revolubly mounted frame, brushes carried thereby, and a foot guard sustained by the frame contiguous to each of said brushes.

39. In combination, a reciprocating carriage, a brush frame revolubly mounted thereon, rotary brushes carried by said frame, a foot rest disposed contiguous to the termination of movement of the frame with the carriage in one direction, means for revolving the frame for successively bringing the brushes thereof in line with the foot rest, and foot guards sustained by the frame contiguous to the brushes thereof.

40. In combination, a foot rest, a movably mounted carriage, brushes sustained thereby, means for moving the carriage for moving the brushes past the foot rest, and guards fixed to the carriage and spaced apart and disposed in planes parallel to the longitudinal axis of the foot rest and on opposite sides thereof.

In testimony whereof I affix my signature in presence of two witnesses.

CHARLES F. BURKHART.

Witnesses:
   BELLE B. FRAME,
   LILLIAN B. PARSONS.